(12) United States Patent
Vesel et al.

(10) Patent No.: US 11,384,213 B2
(45) Date of Patent: Jul. 12, 2022

(54) METHOD OF INCREASING THE HYDROPHILICITY OF A FLUORINE-CONTAINING POLYMER

(71) Applicant: Jozef Stefan Institute, Ljubljana (SI)

(72) Inventors: Alenka Vesel, Ljubljana (SI); Miran Mozetic, Ljubljana (SI); Rok Zaplotnik, Ljubljana (SI); Gregor Primc, Ljubljana (SI); Nina Recek, Ljubljana (SI)

(73) Assignee: Jozef Stefan Institute, Ljubljana (SI)

( * ) Notice: Subject to any disclaimer, the term of this patent is extended or adjusted under 35 U.S.C. 154(b) by 49 days.

(21) Appl. No.: 16/910,247

(22) Filed: Jun. 24, 2020

(65) Prior Publication Data

US 2021/0009777 A1    Jan. 14, 2021

(30) Foreign Application Priority Data

Jun. 25, 2019 (GB) .................................... 1909131

(51) Int. Cl.
*C08F 2/46* (2006.01)
*C08F 2/50* (2006.01)
*C08G 61/04* (2006.01)
*C08J 7/12* (2006.01)

(52) U.S. Cl.
CPC ......... *C08J 7/123* (2013.01); *C08J 2300/102* (2013.01)

(58) Field of Classification Search
CPC ... C08J 7/123; C08J 2327/12; C08J 2300/102
USPC ................... 522/129, 113, 1; 520/1
See application file for complete search history.

(56) References Cited

U.S. PATENT DOCUMENTS 7,258,906 B2 * 8/2007 Grobe, III .................. C08J 7/12
                                                          428/421

FOREIGN PATENT DOCUMENTS

| CN | 101890314 A | 11/2010 |
|---|---|---|
| CN | 202293551 U | 7/2012 |
| CN | 103302862 A | 9/2013 |
| CN | 104998562 A | 10/2015 |
| CN | 105727753 A | 7/2016 |
| CN | 107118381 A | 9/2017 |
| CN | 107174981 A | 9/2017 |
| CN | 106268370 B | 9/2019 |

OTHER PUBLICATIONS

Fantz et al. "Quantification of the VUV radiation in low pressure hydrogen and nitrogen plasmas" Plasma Sources Science and Technology, DOI: 10.1088/0963-0252/25/4/045006, Published Jun. 7, 2016, 15 Pages.
Fouchier et al. "Vacuum ultra violet absorption spectroscopy of 193 nm photoresists" Applied Physics A, DOI: 10.1007/s00339-011-6553-3, Published Aug. 30, 2011, 399-405, 7 Pages.
Geyter et al. "Influence of ambient conditions on the ageing behaviour of plasma-treated PET surfaces" Nuclear Instruments and Methods in Physics Research Sections B: Beam Interactions with Materials and Atoms, 266, Mar. 24, 2008, pp. 3086-3090, 5 Pages.
Kutasi et al. "Controlling the oxygen species density distributions in the flowing afterglow of O2/Ar-O2 surface-wave microwave discharges" J. Phys. D: Appl. Phys. DOI: 10.1088/0022-3727/47/2/025203, (2014), 12 Pages.
Larrieu et al. "Ageing of Atactic and isotactic polystyrene thin films treated by oxygen DC pulsed plasma" Science Direct, Surface & Coatings Technology 200. DOI: 10.106/j.surfcoat.2004.06.032, (2005) 2310-2316, 7 Pages.
Liu et al. "Surface Analysis of long-distance oxygen plasma sterilized PTFE film", Applied Surface Science 255, DOI: 10.1016/j.apsusc.2009.05.027, (2009), pp. 8115-8121, 7 Pages.
Morent et al. "Study of the ageing behaviour of polymer films treated with a dielectric barrier discharge in air, helium and argon at medium pressure" Science Direct, Surface &Coatings Technology 201 (2007) 7847-7854, 8 Pages.
Primc et al. "Microwave discharge as a remote source of neutral oxygen atoms", AIP Advances 1, 022129, Published May 27, 2011, 12 Pages.

(Continued)

*Primary Examiner* — Jessica Whiteley
(74) *Attorney, Agent, or Firm* — Ziegler IP Law Group, LLC

(57) ABSTRACT

Methods for modification of surface wettability of fluorine-containing polymers by sequential treatments first with gaseous plasma rich in ultraviolet radiation, and then oxidation using neutral reactive oxidative species. The methods are rapid and permit treatment of fluorine-containing polymers of any shape and size including 'infinite' materials such as foils. A surface layer of an object made from a fluorine-containing polymer is depleted of fluorine upon interaction with gaseous plasma rich in ultraviolet radiation. The depleted surface layer is then exposed to reactive oxygen species such as neutral oxygen atoms in the ground state. The wettability of objects made from or containing fluorine-containing polymers treated according to the methods of the present disclosure is close to the theoretical limit for smooth polymers well functionalized with polar functional groups. Unlike conventional treatment of fluorine-containing polymers with oxygen plasma, the methods of the present disclosure do not produce hazardous gases such as oxy or peroxy fluorinated carbon compounds.

11 Claims, 2 Drawing Sheets

(56) References Cited

OTHER PUBLICATIONS

Salapare et al. "Stability of the hydrophilic and superhydrophobic properties of oxygen plasma-treated poly (tetrafluoroethylene) surfaces" Journal of colloid and Interface Science 396, Published online Jan. 25, 2013, 287-292, 6 Pages.

Vesel et al. "Surface Modification of polyester by oxygen and nitrogen-plasma treatment" Surf. Interface. Anal. Published Oct. 10, 2008, DOI: 10.1002/sia.2923, 1444-1453, 10 Pages.

Wenfeng et al. "Preparation of a super Hydrophilic Polytetrafluoroethylene surface using a Gaseous Ammonia-water Low-Temperature Plasma" Journal of Photopolymer Science and Technology, vol. 28, No. 3, Oct. 2015, pp. 479-483, 6 Pages.

Wilson et al. "Plasma Modification of PTFE surface, Part I: Surfaces immediately following plasma treatment" Surface and Interface Analysis, (2001) DOI: 10.1002/sia.1065, 385-396, 12 Pages.

* cited by examiner

METHOD OF INCREASING THE HYDROPHILICITY OF A FLUORINE-CONTAINING POLYMER

FIELD

The aspects of the disclosed embodiments relate to methods for making hydrophobic polymers containing fluorine hydrophilic. The method comprises a two-step procedure: first, the surface film of said polymers is treated with ultraviolet and/or vacuum ultraviolet radiation to break bonds between carbon and fluorine and deplete the surface film of fluorine; second, said polymers are treated with atomic oxygen to form oxygen-containing functional groups in the surface film of the treated polymers, thereby increasing hydrophilicity. Such a method may be useful, for example, where adhesion to the polymer surface is needed, such as when paint or functional coatings are applied to polymer substrates, or glue is used to stick a polymer substrate to something else.

BACKGROUND

The wettability of polymer surfaces is an important consideration in some applications, for example where a coating is to be applied to a polymer substrate, or the polymer substrate must be adhered to another object using adhesive. It may therefore be desirable to modify the polymer substrate surface.

Several methods for modification of polymer wettability have been reported. These include treatment with aggressive liquids, plasma and reactive gases. The methods allow for minimal water contact angle of approximately 20° and maximal of approximately 120° for smooth polymers. A widely used method is treatment of polymer materials with gaseous plasma. A gaseous plasma treatment causes functionalization of the polymer to introduce functional groups not originally present in the desired quantity on a polymer surface or not present at all. To make a polymer more hydrophilic, the surface is functionalized with polar groups such as oxygen-containing functional groups. Sometimes, polymer surfaces are functionalized with nitrogen groups which are not as polar as oxygen but may have other useful properties. To make polymers more hydrophobic, non-polar groups are introduced to the polymer surface. Usually, C—$F_x$ groups are introduced onto the polymer surface to increase hydrophobicity.

A straight-forward method for functionalization of a polymer surface with polar oxygen-rich functional groups is treatment with oxygen-containing plasma. Reactive oxygen species such as O, OH, $O_2^{3O}$, $O^+$ readily interact chemically with all polymers. The interaction leads to one or both of the following effects: i) formation of oxygen-rich functional groups, and ii) etching (loss of material from the polymer surface). The formation of oxygen-rich functional groups is typical for numerous fluorine-free polymers. The oxygen-rich functional groups exhibit reasonable stability, although ageing effects have been reported for numerous polymers treated in oxygen plasma (Geyter 2008; Larrieu 2005; Morant 2007; Vesel 2008]. Because the formation of oxygen-rich functional groups on a surface of a fluorine-free polymer is exothermic, it is very likely to occur. As long as the temperature of the fluorine-free polymer is reasonably low, the oxygen-rich functional groups remain on the surface for a long time, enough to make further treatment feasible.

A technological challenge is formation of oxygen-rich functional groups on the surface of a fluorinated polymer. Substitution of fluorine with oxygen atoms on the surface of a fluorinated polymer is an endothermic reaction, meaning that fluorine groups are more stable than oxygen-rich functional groups. As the consequence, exposure of a fluorine-containing polymer to oxygen plasma leads to etching rather than to functionalization with oxygen-rich functional groups. The oxygen from the oxygen-containing plasma therefore interacts with the surface of a fluorine-containing polymer to form unstable fragments containing carbon, fluorine and oxygen. Know fragments of this type include oxy (x=1) and peroxy (x=2) radicals of formulae $CF_3O_x$, $FC(O)O_x$, $CF_3C(O)O_x$ and $CF_3OC(O)O_x$. Such moieties are implicated in depletion of the ozone layer, and their production should be avoided where possible.

Nonetheless, there have been numerous reports in scientific literature of treatment of fluorine-containing polymers with gaseous plasma containing oxygen. Both air and pure oxygen plasmas have been reported for treatment of fluorine-containing polymers to improve the wettability for these materials [Salapare 2013; Wilson 2001; Liu 2009]. The minimal receding water contact angle achievable by treatment of fluorine-containing polymers with gaseous plasma containing oxygen was between 35° and 60°. Such a contact angle is insufficient for numerous applications where highly hydrophilic surface finish of fluorine-containing polymers is desired. Some scientific papers even report the reverse effect: oxygen plasma treatment caused an increase of the water contact angle on the Teflon® surface which became superhydrophobic. Such negative results attributed to etching of a fluorine-containing polymer upon exposure to oxygen plasma, which in turn causes an increased surface roughness and thus an increased water contact angle.

An interesting approach to hydrophilization of PTFE foils was reported recently in the scientific paper W. Hai et al, [Hai, 2015]. Argon plasma was applied with a small (less than 1%) admixture of ammonia and water vapour. The authors reported use of inductively coupled radiofrequency plasma in E mode to benefit from ion bombardment due to acceleration of plasma ions in the sheath between plasma and a polymer foil. A 15-minute treatment time was found suitable for extensive etching and functionalization of the PTFE surface. The pressure was 80 Pa and the discharge tube was rotatable to enable homogeneous treatment of the entire surface of the polymer sample 0.1 mm thick, 12 cm long and 4 cm wide. Such a procedure produced a superhydrophilic surface finish with a 15 minute plasma treatment time. The mixture of ammonia and water vapour was found to be essential because poor wettability was observed when only Ar+$NH_3$ or Ar+$H_2O$ was used; the achievable water contact angles were roughly 80° and 100° for treatments with plasma created in Ar+$NH_3$ or Ar+$H_2O$, respectively.

U.S. Pat. No. 7,258,906(B2) describes a two-step plasma treatment of fluorine-containing polymers in the production of fluorinated contact lenses. These contain a fluorinated bulk material and a surface coating which, when the lens is in an unhydrated state, reportedly has a surface coating characterized by an oxygen content within a depth of about 7.4 nm that is at least 2 mole percent enriched relative to the bulk material, based on XPS analysis. Several examples are presented with the fluorinated bulk material being either fluorogel, fluoroxerogel (complex polymers containing siloxanes) or poly [4,5-difluoro-2,2-bis(trifluoromethyl)-1,3-dioxole-co-tetrafluoroethylene] (thereafter: Teflon® AF 1600). In a first step, hydrogen plasma is used to remove fluorine from the surface, leaving behind a carbon-enriched surface. The plasma is cold plasma, estimated based on power density to have a gas temperature of up to about 70°

C. Desired plasma treatment times for step one were 5 or 10 minutes, and the hydrogen pressure preferably 67 Pa. For the case of fluorogel, weak hydrogen plasma (power up to 100 W) etched the fluorocarbon so the fluorine concentration dropped from original 10% to 5% and 1% for 50 and 100 W, respectively. At larger powers, for example 500 W, the fluorine content remained almost unaffected within the limits of statistical error. Silicon was also etched at specific hydrogen plasma conditions. In step two, hydrogen plasma treated samples were post-oxidized using ammonia plasma at 100 W for 15 minutes to obtain moderately hydrophilic surface finish of water contact angle 35°.

A similar procedure was disclosed in U.S. Pat. No. 7,258,906(B2) for treatment of fluoroxerogel. Mild plasma conditions (5 min, 67 Pa, 25 W) were found to be insufficient, necessitating increasing the treatment time to 10 minutes. At 50 W, 10 min, 67 Pa, depletion of fluorine was observed because the surface concentration of fluorine dropped from initial 28 to 6%. At the same time, oxygen content increased from 15 to 27%, with silicon content remaining approximately the same. At a power of 300 W, hydrogen plasma caused also partial removal of silicon because its concentration decreased from the original 10% to about 5%. The samples treated with hydrogen-plasma at 200 and 300 W were then oxidized using ammonia plasma for 10 minutes. The final surface contained little carbon. The silicon content was 84% and 62% for samples pretreated with hydrogen plasma at 300 and 200 W, respectively. The resultant water contact angle of only 7° was explained by selective removal of the polymer from the fluoroxerogel surface and formation of fluorosilicate particles rather than polymer functionalization.

A disadvantage of using plasma created in ammonia or a mixture of ammonia with oxygen or water vapour treatment of fluorinated polymers is the production of poisonous gaseous products. Typical gaseous products formed upon interaction of such plasma with the polymer include cyanides (—C≡N), in particular cyanohydrins, and hydrofluoric acid (HF).

Finally, U.S. Pat. No. 7,258,906(B2) also describes treatment of Teflon® AF 1600. A DC RFGD system using capacitively coupled discharge suitable for applications such as plasma stripping and descum processing of solid materials was applied. This treatment lasted 10 minutes at 40 Pa and 300 W in hydrogen plasma, followed by 5 minutes of air plasma treatment at 40 Pa and 100 W. A super-hydrophilic surface finish is reported in U.S. Pat. No. 7,258,906(B2) for these samples.

Other efforts to effect hydrophilization of fluorine-containing polymers have been reported in, for example, CN107118381(A), CN105727753(A), CN104998562(A), CN107174981(A), CN103302862(A), CN202293551(U) and CN101890314(A). Many of these include etching the polymer surface then grafting or impregnating polymer groups. The reported hydrophilicity of the treated products is moderate, with contact angles of 35° to 45°.

The prior art can therefore be summarized as follows. Scientific literature reports about treatment of fluorine-containing polymers (usually PTFE) with gaseous plasma containing oxygen and/or nitrogen suggest that the minimal achievable water contact angle is typically approximately 35°, often larger. A super-hydrophilic surface finish (water contact angle below 4°) was reported obtained by 15-minute treatment with argon plasma of small admixture of both ammonia and water vapour at 80 Pa and 100 W, with the presence and ratio of ammonia and water vapour crucial to the process. As so much of the literature in the field reports water contact angles above or equal to 35° it may be reasonable to assume that this value is a natural limitation for smooth materials treated by different processes.

There have been numerous reports of two-step processes. These typically include (i) plasma etching and (ii) grafting, for example coating with a very thin film of a polymer other than a fluorine-containing polymer. The reported achievable water contact angle is 35° or higher.

A two-step process which includes hydrogen plasma treatment of contact lens followed by oxidation in ammonia or air plasma has been reported.

All of the prior art methods suffer from rather long treatment times and are mostly improper for industrial scale-up, for reasons of time and/or the production of hazardous or environmentally damaging materials.

SUMMARY

The aspects of the disclosed embodiments have been devised in light of the above considerations.

The aspects of the disclosed embodiments provide a two-step procedure for the treatment of fluorine-containing polymers to improve their hydrophilicity. The methods are fast and amenable to scale up and continuous processing. The production of hazardous or harmful byproducts is reduced, and waste gaseous products can be recycled.

The first step treats the surface of a fluorine-containing polymer with vacuum ultraviolet (VUV) radiation and/or ultraviolet radiation (UV) (hereinafter referred to as VUV and/or UV or VUV/UV). It may be termed an irradiation step. Suitably, the VUV/UV radiation used in methods described herein has a photon energy of more than 6 eV. Suitably it also has a photon energy of not more than 11.3 eV. This step may be short, less than one minute. Very short treatment times of less than 10 s are preferred. Preferably, but not necessarily, during irradiation the fluorine-containing polymer is exposed to hydrogen atoms (H-atoms).

The hydrogen atoms may be part of a plasma used to treat the surface. Hydrogen plasma may generate both the VUV/UV radiation and the H-atoms used in the first step. In other words, the first step may comprise treating the surface of a fluorine-containing polymer with hydrogen plasma. Suitably, the radiation generated and used in the plasma treatment step has photon energy at least 6 eV. Suitably, the radiation generated and used in the plasma treatment step has photon energy not more than 11.3 eV. The hydrogen plasma may be termed rich in VUV/UV radiation. The power density is suitably several 1,000,000 W/m³. Power density is calculated first by measuring the output power of the RF generator and the reflected power. The absorbed power is output-reflected. All modern RF generators are equipped with both power meters. It will be understood that some of the (forward-reflected) power could go somewhere else but this effect is minimized such that it is marginal. The power density is then calculated as ((forward-reflected) power) divided by the volume of glowing plasma (typically equal to the volume of plasma reactor).

However, it is not necessary that the surface of a fluorine-containing polymer is treated with plasma.

This step may be short, less than one minute. Very short treatment times of less than 10 s are preferred. Treatment times of 1 s are exemplified.

This depletes the fluorine component of the surface of the fluorine-containing polymer.

In the second step, oxygen-rich functional groups are introduced onto the surface of polymers modified according to the first step. This is achieved by treatment with a strong oxidant such as atomic oxygen, referred to herein as a neutral reactive oxygen species. The second step is not performed using gaseous plasma, avoiding the ecological hazard explained above. Furthermore, oxygen plasma contains a substantial amount of positively charged oxygen ions which cause removal of the F-depleted layer. This is avoided in the methods of the present disclosure.

The methods of the present disclosure are ecologically benign and scalable.

Accordingly, in a general aspect the present disclosure may provide a method of increasing the hydrophilicity of a fluorine-containing polymer, the method comprising:

(i) a first step of treating a surface of a fluorine-containing polymer with radiation having a photon energy at least 6 eV to deplete the fluorine content of the surface of the fluorine-containing polymer; then (ii) exposing the treated surface (produced in the first step) to a neutral reactive oxygen species.

In a first aspect, the disclosed embodiments may provide a method of increasing the hydrophilicity of a fluorine-containing polymer, the method comprising:

(i) a first step of treating a surface of a fluorine-containing polymer with radiation having a photon energy at least 6 eV and not more than 11.3 eV, and a flux of at least $10^{20}$ $m^{-2}$ $s^{-1}$, to deplete the fluorine content of the surface of the fluorine-containing polymer; then (ii) exposing the treated surface to neutral oxygen atoms in the absence of plasma conditions, the fluence of said neutral oxygen atoms being between $10^{24}$ and $10^{26}$ $m^{-2}$.

It will be understood that radiation having a photon energy at less than 6 eV may also be generated in the first step.

The treatment with the neutral reactive oxygen species causes functionalization of the fluorine-depleted surface layer of the fluorine-containing polymer with polar functional groups, thereby improving hydrophilicity.

It will be understood that the neutral reactive oxygen species does not refer to plasma. In other words, step (ii) does not use plasma. Suitably, the neutral reactive oxygen species may be selected from O-atoms, OH radicals (OH.) and ozone $O_3$, for example, O-atoms or OH radicals (OH.). In the first aspect of the present disclosure neutral oxygen atoms are used.

In some embodiments, the neutral reactive oxygen species is O-atoms, which are suitably in the ground state.

Preferably, the flux of photons (radiation) having a photon energy of at least 6 eV is at least $10^{20}$ $m^{-2}$ $s^{-1}$. It may preferably be at most $10^{22}$ $m^{-2}$ $s^{-1}$.

In preferred embodiments, step (i) includes treating the surface of a fluorine-containing polymer contemporaneously with radiation having a photon energy at least 6 eV and not more than 11.3 eV, and preferably a flux of at least $10^{20}$ $m^{-2}$ $s^{-1}$ and with hydrogen atoms, which may preferably have a flux of $10^{20}$ to $10^{24}$ $m^{-2}$ $s^{-1}$.

The hydrogen atoms may be supplied separately to the radiation source, or the hydrogen atoms and radiation may be generated by the same source. Suitably, that source is hydrogen plasma.

Accordingly, in some embodiments step (i) includes treating the surface of a fluorine-containing polymer with hydrogen plasma. The hydrogen plasma may contain up to 30% v/v another compound, for example a noble gas, methane or other hydrocarbon, nitrogen or water vapor or a mixture of such gases. Preferably, the non-hydrogen content of the plasma is less than 20% v/v, more preferably less than 10% v/v. In some cases, the hydrogen plasma is generated using substantially pure hydrogen.

Suitably, the power density of the plasma is at least or greater than $10^6$ W $m^{-3}$. It may suitably be at most $10^8$ w $m^{-3}$.

The time of exposure of said fluorine-containing polymer to radiation in step (i) may be below 100 s, preferably below 10 s. In some cases, it is about 1 s. The inventors have observed that the optimal time is determined by pressure and power during step (i), for example the pressure and power of plasma. For the pressure and power densities exemplified herein, the inventors believe that 1 s is suitable. At higher power densities, suitable durations may be even shorter.

Accordingly, where plasma is used to generated radiation (and, optionally, hydrogen atoms) the chamber in which step (i) takes place (plasma reactor) is suitably evacuated to a low pressure, below 10 Pa, below 5 Pa, below 3 Pa, below 1 Pa or even below 0.1 Pa before filling with hydrogen. The inventors have observed that very low pressures are not needed, although they may be used, because small amounts of contaminants in the plasma do not appreciably affect the experiment. For a balance of economy, ease and results, the inventors typically evacuate to about 1 Pa.

Where hydrogen plasma is used, the hydrogen pressure is suitably between 1 and 100 Pa, preferably between 3 and 100 Pa, more preferably between 5 and 60 Pa, most preferably between 10 and 30 Pa. The inventors have observed that pressures lower than 1 Pa do not generate sufficient radiation to effect depletion within a reasonable timeframe. Pressures higher than 100 Pa may cause temperatures that alter the surface of the polymer.

In step (ii), the treated fluorine-containing polymer is exposed to a neutral reactive oxygen species, for example O-atoms.

Optimal exposure time of said polymers containing fluorine pre-treated with hydrogen plasma to oxygen atoms will depend on the flux of O-atoms supplied. Preferably, the fluence of reactive oxygen species onto the fluorine-containing polymer surface is greater than about $10^{23}$ $m^{-2}$, for example between about $10^{24}$ and about $10^{26}$ $m^{-2}$ (inclusive). In some embodiments, the fluence (dose) of reactive oxygen species onto the fluorine-containing polymer surface is between $10^{23}$ $m^{-2}$ and $10^{26}$ $m^{-2}$.

Fluence a product of flux and time provided the flux is constant. In methods described herein, the flux was constant (otherwise the fluence is time integral of flux(t) dt). Provided plasma parameters don't drift with time the simple (former) definition is used and will be understood to apply here. The flux of photons is measured using a photometer calibrated for a certain range of wavelengths. The flux of atoms is calculated as $j=¼ n<v>$, where n is atom density in vicinity of a sample and $<v>$ is the average random velocity of thermal motion of atoms, i.e. $<v>=sqrt(8 kT/\pi m)$, where k is Boltzmann constant and m is the mass of an atom. These methods are routinely used and understood in the art.

At these fluxes or fluences, treatment times are short. Suitable treatment times may be below 100 s, preferably below 10 s.

Step (i) and step (ii) may be performed in the same reactor. In that case, the method suitably includes a step of separating the treated fluorine-containing polymer from the plasma and/or plasma treatment step by-products, for example, by evacuation of the chamber. A vacuum pump in gated fluid communication with the reaction chamber can be used to evacuate the chamber.

Alternatively, step (i) and step (ii) may performed in separate reactors. This is especially desirable for the treatment of a continuous film of polymer. The film may pass through a first reactor, in which it undergoes the plasma treatment step (step (i)) then pass through an essentially gas-tight flow path to a second reactor in which it undergoes the oxidation step (step (ii)). In such a system, the gaseous content of the first and second reactors is contained to those reactors, and do not mix.

Reactors for hydrogen plasma are known in the art and conventionally used. Sources of O-atoms and methods of generating O-atoms are known in the art and described herein. See Primc 2011 and Kutasi 2014.

The present disclosure may, in a further aspect, provide an apparatus substantially as depicted in FIG. 2.

The aspects of the disclosed embodiments may provide an apparatus for use in a two-step method of hydrophilization of a fluorine containing polymer, the apparatus comprising a plasma reactor controllably connected to a vacuum pump, and a second reactor which is controllably connected to a source of reactive oxygen species (e.g. O-atoms) and a second vacuum pump, wherein the apparatus further comprises a first roll-on unit and a second roll-on unit, and wherein the apparatus is configured such that, in use, a sheet of fluorine containing polymer on the first roll-on unit passes through and out of the plasma reactor, into the second reactor, then out of the second reactor onto the second roll-on unit.

Suitably, the sheet passes into and out of the plasma reactor and into and out of the second reactor via substantially gas-tight conduits to prevent mixing of gases within the reactors with each other and with the surrounding air, and to permit evacuation of the chambers.

The fluorine-containing polymer may be left at room temperature or may be cooled down to a temperature below the room temperature before treatment with hydrogen plasma. The temperature of the polymers containing fluorine may not be heated substantially over room temperature.

In one embodiment, the plasma reactor, after said depletion is accomplished, may be filled with any gas containing reactive oxygen species. The list of suitable gases or gas mixtures in this step includes but is not limited to hydrogen peroxide and ozone. Preferably, the reactive oxygen species are O-atoms.

Using the aspects of the disclosed embodiments, it is possible to obtain a depletion of fluorine in the surface film of polymers containing fluorine in a short time (such as one second of treatment) by VUV/UV irradiation, preferably in the presence of H-atoms. The radiation may be generated by hydrogen plasma or plasma created in different gases as stated above. Where hydrogen plasma is used, that also serves as source for H-atoms.

Using the aspects of the disclosed embodiments, it is possible to obtain saturation of fluorine-depleted surface film of fluorine-containing polymer with polar oxygen-rich functional groups in a short time such as few seconds of treatment with neutral oxygen atoms in the ground state.

Still more optional features of the present disclosure and further technical explanations of preferred embodiments of the present disclosure are set out below.

In the plasma reactor, at least one piece of a fluorine containing polymer may be mounted. The plasma reactor may be filled with a hydrogen-containing gas including but not limited to pure hydrogen with a density of molecules of approximately $10^{21}$ or $10^{22}$ m$^{-3}$. The gaseous plasma may be created in the plasma reactor by any suitable discharge as described herein. Normally, plasma reactors operate in such a way that gas is leaked into the reactor at one side and is then removed by pumping on the other side. This avoids build-up of reaction products in the reactor, which can cause drift of plasma parameters. That consideration is not generally a problem in the methods of the present disclosure. In methods of the present disclosure one can evacuate the reactor, close the pump, fill the reactor with H$_2$ at low pressure, close the leak valve and begin plasma treatment. Accordingly, in some embodiments, the gas used to form plasma is not leaked into the plasma reactor and pumped from the plasma reactor continuously. In some embodiments, plasma reactor is pumped down to the ultimate pressure achievable by the suitable vacuum pump, then the pump is separated from the plasma reactor, then hydrogen (or other gas) is leaked into the evacuated plasma reactor until a suitable pressure is achieved, then source of hydrogen is separated from plasma reactor, then plasma is ignited until the surface film of a fluorine-containing polymer is depleted from fluorine. Once the depletion is accomplished, the plasma reactor may be evacuated to ultimate pressure. Then, neutral reactive oxygen species are leaked into the plasma reactor until the surface of said fluorine-depleted surface film is saturated with oxygen-rich functional groups.

It shall be understood that hydrogen can be replaced with any other gas or gas mixture containing hydrogen. It shall be understood that oxygen atoms can be replaced with any oxidant that assures for efficient functionalization of fluorine-free surface such as ozone, hydroxyl radicals and hydrogen peroxide.

In a further aspect, the disclosed embodiments provide a polymer product obtained by any method of the present disclosure as defined herein. Such products have very high wettability—close to the theoretical limit of the water contact angle, which is approximately 20° for smooth polymers.

In some embodiments, the contact angle of a water droplet on the surface of a polymer treated according to methods of the present disclosure is below 40°, preferably below 25°.

Preferred products are textiles, printable foils, polymer products that should be painted, printed or glued, medical implants etc.

In summary, the aspects of the disclosed embodiments may provide methods for hydrophilization of polymers containing fluorine using a two-step procedure. The first step assures for depletion of fluorine from the surface film of a polymer containing fluorine using extensive VUV radiation and, optionally, hydrogen atoms, and the second step for saturating surface of said polymer with polar, oxygen-rich functional groups by treatment with oxygen atoms in the ground state without interacting surfaces with gaseous plasma. Such a surface finish is stable and assures for long-lasting hydrophilicity of otherwise hydrophobic polymers. The provided methods are ecologically suitable because no hazardous compound is produced.

The present disclosure includes the combination of the aspects and preferred features described except where such a combination is clearly impermissible or expressly avoided.

SUMMARY OF THE FIGURES

Embodiments and examples illustrating the principles of the present disclosure will now be discussed with a reference to the accompanying figures in which.

DEFINITIONS

Fluorine-Containing Polymers

Figure 1:
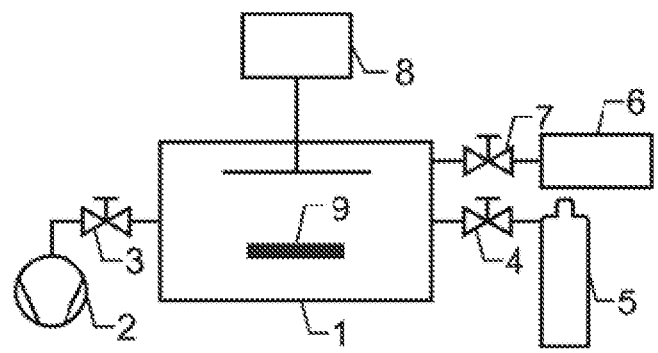
FIG. 1 shows a schematic of the two-step procedure in a batch mode.

The term fluorine-containing polymers is used herein to refer to any fluorocarbon-based polymers with multiple carbon-fluorine bonds. They are characterized by a high resistance to solvents, acids, and bases. The most well-known fluorine-containing polymer is polytetrafluoroethylene (PTFE), which is more known with its brand name Teflon®. Such polymers are also referred to as fluoropolymers and fluorocarbon-based polymers. This group of polymer materials that are widely used in industry, medicine and homeware. For example, they have been used in textiles, kitchenware, fuel cells, electrochemical devices, chlor-alkali production, metal-ion recovery, water electrolysis, plating, surface treatment of metals, batteries, sensors, Donnan dialysis cells, drug release, gas drying or humidification, and superacid catalysis for the production of fine chemicals.

In some embodiments, the fluorine-containing polymer is selected from polytetrafluoroethylene, polyvinylfluoride, polyvinylidene fluoride, polychlorotrifluoroethylene, fluorinated ethylene-propylene, polyethylenetetrafluoroethylene, polyethylenechlorotrifluoroethylene, chlorotrifluoroethylenevinylidene fluoride, perfluoropolyether and perfluorosulfonic acid (PFSA) polymer. In some preferred embodiments the fluorine-containing polymer is polytetrafluoroethylene.

Wettability

"Wettability" refers to the ability of a material to interact with liquids. The wettability is often expressed in the terms of the contact angle of a small water droplet placed onto the surface of a solid material. If the contact angle is small (below 90°), the solid material is hydrophilic; otherwise, it is hydrophobic.

In other words, the term hydrophilic, as used herein, refers to a surface having a contact angle of below 90°. The term hydrophobic refers to a surface having a contact angle of 90° or more.

Some materials exhibit superior properties in terms of wettability. For example, nanostructured hydrophobic materials may exhibit super-hydrophobic character (water contact angle more than ~150°), whereas nanostructured hydrophilic materials exhibit super-hydrophilic character (water contact angle of few degrees). Polymers of a smooth surface never exhibit super-hydrophobic or super-hydrophilic character. The maximal achievable contact angle for smooth polymers is approximately 125°. Smooth fluorine-containing polymers such as Teflon® exhibit a water contact angle of approximately 110°. Smooth highly hydrophilic polymers exhibit a water contact angle of approximately 50°.

VUV/UV radiation

The present disclosure uses VUV/UV to deplete the fluorine component of the surface of the fluorine-containing polymer.

As used herein, UV refers to radiation in a range, 130-400 nm, while VUV refers to radiation below 130 nm). The photon energy is inversely proportional to the radiation wavelength. Suitably, the VUV/UV radiation has a photon energy of at least 6 eV, for example not less than 6.2 eV. It may have a photon energy of not more than 11.3 eV.

The radiation may be generated using any suitable method. The radiation may be generated by plasma that is in contact with the surface of the fluorine-containing polymer, or it may be generated by plasma that is not in contact with the fluorine-containing polymer. For example, it may be separated by a MgF$_2$ sheet which permits transmission of most radiation in the plasma, but prevents atomic species (such as hydrogen in the case of hydrogen plasma) contacting the surface of the fluorine-containing polymer.

Plasma

Plasma is a state of matter in which an ionized gaseous substance becomes electrically conductive to the point that long-range electric and magnetic fields dominate the behaviour of the matter. The term is well-understood in the art.

Plasma may be generated by application of an electric current across a dielectric gas. In the methods of the present disclosure, that gas is hydrogen. A conventional plasma generator uses radiofrequency (RF), operating at 13.56 MHz. In the methods of the present disclosure the plasma is rich in ultraviolet radiation (and/or vacuum ultraviolet radiation). The term vacuum ultraviolet is used in the art to refer to the short-wavelength portion of the electromagnetic spectrum where the photons are energetic enough to excite a typical atom from the ground state to ionization.

Without wishing to be bound by theory, it is assumed that the hydrogen plasma in the plasma reactor is a rich source of both radiation and reactive hydrogen species. The radiation appears in visible (Vis), ultraviolet (UV) and vacuum ultraviolet (VUV) ranges. The radiation in the Vis range (wavelength 400-800 nm) results from excited hydrogen molecules radiating Fulcher band, as well as from excited hydrogen atoms radiating Balmer series. The radiation in the UV range (130-400 nm) results from excited hydrogen molecules radiating Lyman band as well as continuum arising from transitions from bounded to unbounded molecular states. The radiation in the VUV range (below 130 nm) results from Werner band and Lyman series [Fant 2006]. The photon energy is inversely proportional to the radiation wavelength.

The photon energy in Vis and part of UV range is not thought to be sufficient for breaking C—F bonds in a fluorine-containing polymer. The radiation suitable for breaking C—F bonds arises from Werner band and Lyman series as well as the Lyman band (so some of the UV range, and VUV, referred to herein as UV and/or VUV). The radiation generated and used in the plasma treatment step (referred to as UV and/or VUV herein) may be characterized by its photon energy. Suitably, the radiation generated and used in the plasma treatment step has photon energy of more than 6 eV. It may also have a photon energy of not more than 11.3 eV. The power density is suitably several 1,000,000 W/m$^3$.

The radiation arising from Werner band and Lyman series is thought to be particularly useful because the penetration depth of photons of energy more than 10 eV is less than 20 nm, that is, there is a short penetration depth. [Fouchier, 2011]. The photons arising from Werner band and Lyman series are therefore effectively absorbed in the surface film of a fluorine-containing polymer and a substantial fraction of these photons causes breakage of the C—F bonds in the surface layer of a fluorine-containing polymer.

Figure 2:
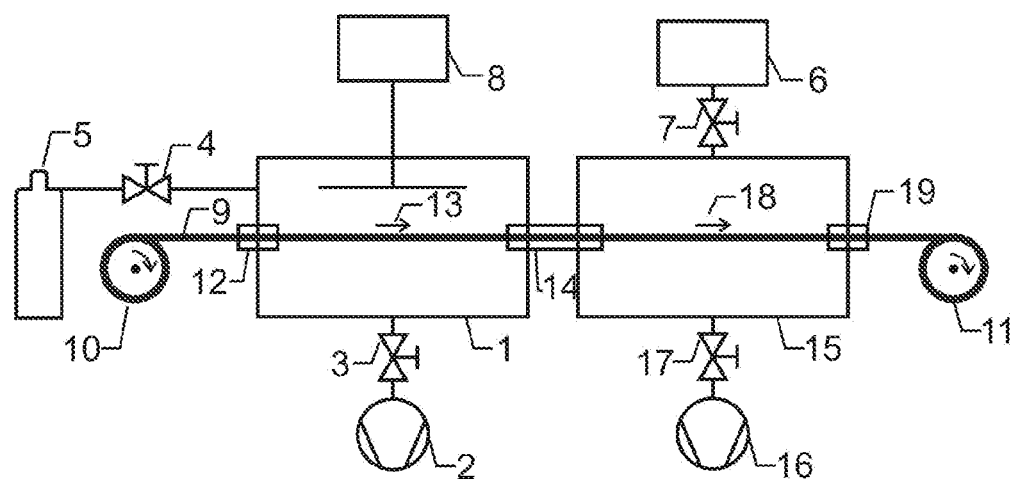
FIG. 2 shows a schematic of the two-step procedure in a continuous mode (roll-to-roll).
Figure 3:
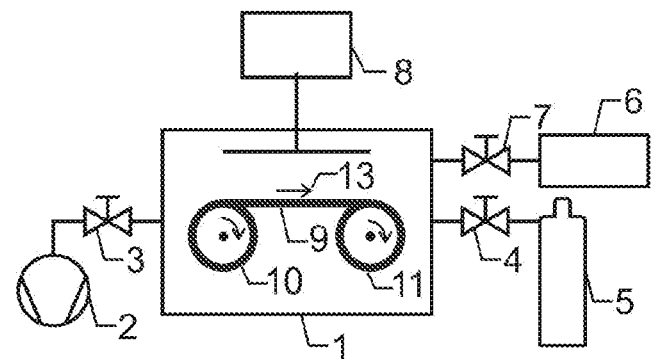
FIG. 3 shows a schematic of an alternative two-step procedure in a continuous mode.

The breakage of the bonds allows fluorine to interact chemically with any suitable radical, including reaction with a further F atom to form fluorine gas. In the case of hydrogen plasma, the radicals that are capable to interact with fluorine atoms are hydrogen atoms. Hydrogen plasma used in any of the systems shown schematically in FIGS. 1-3 is rich in H atoms which are a result of dissociative collisions of plasma electrons with hydrogen molecules. Simultaneous treatment of a polymer-containing material with a radiation arising from several relaxations of excited $H_2$ molecules including Werner band and Lyman series, and hydrogen atoms therefore results in chemical interaction between fluorine and hydrogen atoms forming HF molecules. These HF molecules desorb from the surface of the fluorine-containing polymer upon vacuum conditions.

What is left on the surface of a fluorine-containing polymer after treatment with hydrogen plasma is a surface layer of a polymer depleted from fluorine.

Hydrogen plasma can be sustained in a range of conditions at various pressures and discharge powers. Plasma can be hot or cold, but hot plasma was not found to be suitable for the methods of the present disclosure because it causes substantial heating of a fluorine-containing polymer. Such an extensive heating has a negative effect because reactive hydrogen species may interact chemically with the fluorine-depleted layer on the surface of a fluorine-containing material. Cold hydrogen plasma can be sustained at low pressure.

However, it will be understood that the present disclosure is not limited to hydrogen plasma. Other plasma may be used to generate the VUV/UV radiation, or plasma comprising hydrogen and another gas, for example methane or any other hydrocarbon or a mixture of such gases with hydrogen may be used. In some embodiments, a mixture of hydrogen and nitrogen. Where the plasma is not hydrogen plasma and/or does not contain hydrogen, suitably the plasma is separated from the surface of the fluorine-containing polymer, for example using an $MgF_2$ slice.

Suitably, the plasma used in methods of the present disclosure is "non-equilibrium" plasma. This means that the electron temperature and excitation temperature is more than that the neutral gas temperature. In methods of the present disclosure, it is estimated that that the electron temperature and the excitation temperature is between 10,000 and 100,000° C., but the neutral gas temperature is probably around 500° C., and certainly not more than 1000° C. (based on the power density used). Since the treatment time is only 1 s the Teflon sample does not heat significantly. In fact, the major heating mechanism is heterogeneous surface recombination of H atoms to parent molecules and neutralization of hydrogen ions and weak bombardment because the sample is floating on plasma potential.

Suitably, the sample temperature during plasma treatment is below 200° C., for example below 100° C.

At atmospheric pressure, the glowing plasma is limited to the volume where high electrical field is present. As the pressure decreases, the glowing plasma expands to a larger volume and eventually a uniform plasma fills the entire volume of a plasma reactor. The methods of the present disclosure take advantage of this effect. Therefore plasma in the reactor chamber is suitably sustained at a reduced pressure, for example below 300 Pa, preferably below 100 Pa, more preferably below 50 Pa, or even below 30 Pa. Accordingly, the pressure in the reaction chamber during the plasma treatment step may be between 10 Pa and 300 Pa, between 10 Pa and 100 Pa, between 10 Pa and 50 Pa, between 10 Pa and 30 Pa. Pressure may be measured using a measure meter, as is conventional in the art. Pressure, as described herein, is measured at room temperature (about 20° C.).

The loss of charged particles in plasma is predominantly by three-body collisions, the frequency of which is proportional to the square of pressure. To minimize the loss of charged particles and thus maximize the energy efficiency of the process, the gas pressure should be as low as possible. Without wishing to be bound by theory, it is assumed that the radiation arising from the relaxation of hydrogen molecular and atomic states increases linearly with increasing density of hydrogen in plasma reactor providing the plasma parameters, in particular electron density and temperature, remain constant. From this point of view, a too-low pressure is inappropriate because it does not assure for extensive irradiation of a fluorine-containing polymer with an appropriate UV and/or VUV radiation. Obviously, a range of pressures exist where the pressure is low enough to suppress the loss of charged particles and high enough to assure for extensive irradiation with UV and/or VUV photons. Our experiments indicate that the most suitable range of pressures is between approximately 10 and 50 Pa.

In the methods of the present disclosure, very short plasma treatment times are possible. This is achieved by a high flux of VUV and/or UV radiation onto the polymer surface. In a preferred embodiment, the flux of VUV and/or UV photons (that is, radiation) of the energy 6 eV or more is more than approximately $1\times10^{19}$ $m^{-2}$ $s^{-1}$, preferably more than approximately $1\times10^{20}$ $m^{-2}s^{-1}$, for example at least $10^{20}$ $m^{-2}s^{-1}$. Such a large flux of VUV protons is possible only at an elevated power density of plasma. In a preferred embodiment, a power density is more than approximately $10^6$ W $m^{-3}$, preferably approximately $10^6$ W $m^{-3}$ to $10^8$ W $m^{-3}$, for example $10^7$ W $m^{-3}$. This is about 1000-times greater than the estimated power density of U.S. Pat. No. 7,258,906.

In some embodiments, the flux of VUV and/or UV photons (that is, radiation) of the energy 6 eV or more is at most or less than $1\times10^{24}$ $m^{-2}$ $s^{-1}$, preferably less than approximately $1\times10^{22}$ $m^{-2}s^{-1}$, for example at most $10^{22}$ $m^{-2}s^{-1}$.

By contrast, methods of the prior art such as those reported in U.S. Pat. No. 7,258,906 (B2) use smaller VUV radiation flux, which leads to the longer treatment times needed, for example 5-15 minutes. It will be appreciated that while such lengthy treatment times maybe suitable for the treatment of series of objects, for example lens, where many objects are treated in a single step, it is unlikely to be suitable for mass production or treatment of larger items which may be treated in smaller numbers or singly.

Hydrogen Atoms

During the first step, the surface of the fluorine-containing polymer may be exposed to hydrogen atoms. The hydrogen atoms may be generated by plasma, with which the surface of the fluorine-containing polymer is in contact. This is a preferred embodiment of the present disclosure.

The hydrogen atoms may also be supplied separately to the surface, the surface being separated from the plasma, for example using an $MgF_2$ slice or similar. H-atoms may be generated by plasma, or electric discharge and may be maintained at low pressure. Methods of generating hydrogen atoms are known in the art.

The inventors have found that a supply of hydrogen atoms is not essential for the present disclosure. In experiments in which the fluorine-containing polymer was shielded from hydrogen atoms generated by hydrogen plasma by an $MgF_2$ slice (and no other source of hydrogen atoms was used) modification of a Teflon® sheet was successful.

However, superior results were obtained when H-atoms were in contact with the surface of the fluorine-containing polymer during the irradiation step, either through direct contact with hydrogen plasma or through a supply of H-atoms under an $MgF_2$ slice.

The flux of hydrogen atoms may preferably be $10^{20}$ to $10^{24}$ $m^{-2}$ $s^{-1}$.

Neutral Reactive Oxygen Species

"Neutral reactive oxygen species" are any oxygen species capable of formation oxygen functional groups on the surface of a polymer almost free from fluorine which do not bear a positive or negative charge. Examples include O-atoms in the ground and excited states, $O_2$ molecules in electronically excited states (often referred as the "a" and "b" state at the excitation energy of about 1 and 2 eV, respectively, preferably in the "b" state), OH radicals, ozone and hydrogen peroxide.

Preferably, the neutral reactive oxygen species used in the methods of the present disclosure is selected from O-atoms, OH radicals (OH.) and ozone $O_3$, for example, O-atoms or OH radicals (OH.). In the first aspect of the present disclosure neutral oxygen atoms are used.

Most preferably, the neutral reactive oxygen species used in the methods of the present disclosure is O-atoms. Suitably, the O-atoms are provided in the ground state, that is, having an electronic outer shell configuration of $2s^2 2p^4$ (2p ↑↓ ↑ ↑) As the radiative life time of the O-atom excited state is much less than a second so it is not feasible to have a high concentration in any gas except plasma. The life-time of O-atoms in the ground state is almost infinite at low pressure, although in practice they associate to molecules upon surface reactions (heterogeneous surface recombination). O-atoms can be present in a vacuum reactor at the density of more than $10^{20}$ $m^{-3}$ or even more than $10^{21}$ $m^{-3}$ providing they are constantly supplied from the source, and $O_2$ molecules are constantly removed from the reactor by pumping. Continuous supply of O-atoms and simultaneous pumping of $O_2$ molecules is adopted in configurations presented in FIGS. 1-3 and is a preferred feature of the methods described herein.

The source of O-atoms is not limited, but in preferred embodiments it is either a hot filament placed downstream of the molecular oxygen flow through the source (6), or a discharge which enables sustaining plasma in the source (6) but not in the reactor (1). A preferred option for generating neutral reactive oxygen species uses microwave discharge as reported by Primc at al [Primc 2011], the method for generation of neutral reactive oxygen species in which is incorporated herein by reference in its entity.

DETAILED DESCRIPTION

Aspects and embodiments of the present disclosure will now be discussed with the reference to the accompanying figures. Further aspects and embodiments will be apparent to those skilled in the art.

The usefulness of the methods of the present disclosure is demonstrated for perhaps the most common fluorine-containing polymer (9) which is polytetrafluoroethylene, marketed under the brand name Teflon®. It will be appreciated that other fluorine-containing polymers are also within the ambit of the present disclosure.

The present disclosure relates to methods of hydrophilization of fluorine-containing polymers (9). Advantageously, the methods of the present disclosure enable hydrophilization of a fluorine-containing polymer (9) without producing hazardous gases such as oxy (x=1) and peroxy (x=2) radicals $CF_3O_x$, $FC(O)O_x$, $CF_3C(O)O_x$ and $CF_3OC(O)O_x$ or cyanohydrins.

The process is a two-step procedure: (i) a treatment step with H atoms and UV/VUV radiation and (ii) an oxidation step. Before step (ii) is a step of separating the plasma and nascent HF molecules from the treated fluorine-containing polymer. This may be achieved by evacuation of the reactor chamber and/or by removing the fluorine-containing polymer during or after step (i) treatment. This first option of evacuating the chamber may use apparatus as shown in FIG. 1, in which plasma is used to provide H atoms and UV/VUV radiation. In performing a method of the present disclosure in FIG. 1 a plasma reactor (1) is pumped with a vacuum pump (2) which may be separated from the plasma reactor with a gate valve (3). Hydrogen is introduced into the plasma reactor (1) through a flow controller or a leak valve (4) from a hydrogen flask (5). The source of reactive oxygen species (6) is mounted onto the plasma reactor (1). The valve (7) enables separating the source of reactive oxygen species (6) from the plasma reactor (1). The plasma reactor (1) is powered with a power supply (8) which enables sustenance of gaseous plasma inside the plasma reactor (1). A piece of a fluorine-containing polymer (9) is placed inside the plasma reactor (1).

The second option of removing fluorine from the surface layer of the treated fluorine-containing polymer may be obtained using the apparatus as shown in FIG. 2. In FIG. 2 a plasma reactor (1) is pumped with a vacuum pump (2) which may be separated from the plasma reactor (1) with a gate valve (3). Hydrogen is introduced into the plasma reactor (1) through a flow controller or a leak valve (4) from a hydrogen flask (5). A fluorine-containing material (9) is moved from the first roll-on unit (10) through two treatment steps to the second roll-on unit (11). A fluorine-containing material (9) enters first the plasma reactor (1) through the first inlet system (12) which is essentially hermetically tight so it prevents any mixing of the surrounding gas with hydrogen inside the plasma reactor (1). The plasma reactor (1) is powered with a power supply (8) which enables sustenance of gaseous plasma inside the plasma reactor (1). A fluorine containing material (9) moves through the plasma reactor (1) in the sense marked with the arrow (13) and reaches the second inlet system (14) which is essentially hermetically tight so it prevents any mixing of hydrogen inside the plasma reactor (1) with any gas inside the second reactor (15). The second reactor (15) is equipped with a source of reactive oxygen species (6) and pumped continuously with a second vacuum pump (16) which enables a continuous supply of reactive oxygen species (in this case, O-atoms) from the source (6) into the second reactor (15). The second vacuum pump (16) is separated from the second reactor (15) with a gate valve (17). A fluorine containing material (9) further moves through the second reactor (15) in the sense marked with the arrow (18) and reaches the outlet system (19) which is essentially hermetically tight so it prevents any mixing of reactive oxygen species inside the second reactor (15) with surrounding gas.

Accordingly, in some preferred embodiments the method may comprise the following steps. First, treatment with hydrogen plasma in a reactor chamber (1) is applied to deplete the surface layer of a fluorine-containing polymer (9) from fluorine. After the treatment in the first step, the surface layer with the thickness several nanometers contains much less fluorine than the untreated material, typically an order of magnitude. Second, and after depleting the surface layer of a fluorine-containing polymer (9) from fluorine, a fluorine-containing polymer (9) is exposed to reactive oxygen species from the source (6) in the second chamber (15), to form polar functional groups on the surface of a fluorine-containing polymer (9). Reactive oxygen species from the source (6) are preferably neutral oxygen atoms in the ground state.

An alternative apparatus set-up is shown in FIG. 3. In FIG. 3 a plasma reactor (1) is pumped with a vacuum pump (2) which may be separated from the plasma reactor with a gate valve (3). Hydrogen is introduced into the plasma reactor (1) through a flow controller or a leak valve (4) from a hydrogen flask (5). The source of reactive oxygen species (6) is mounted onto the plasma reactor (1). The valve (7) enables separating the source of reactive oxygen species (6) from the plasma reactor (1). The plasma reactor (1) is powered with a power supply (8) which enables sustenance of gaseous plasma inside the plasma reactor (1). A fluorine-containing polymer (9) is placed inside the plasma reactor (1). A fluorine-containing polymer foil (9) is mounted onto the roll-to-roll system (10, 11) which enables moving the polymer material (9) from the first roll-on unit (10) to the second roll-on unit (11) of the roll-to-roll system in both senses (that is, from the left roll to the right role when hydrogen plasma is on. Then from the right role to the left when the O-atom source is on, or vice versa).

Figure 4:
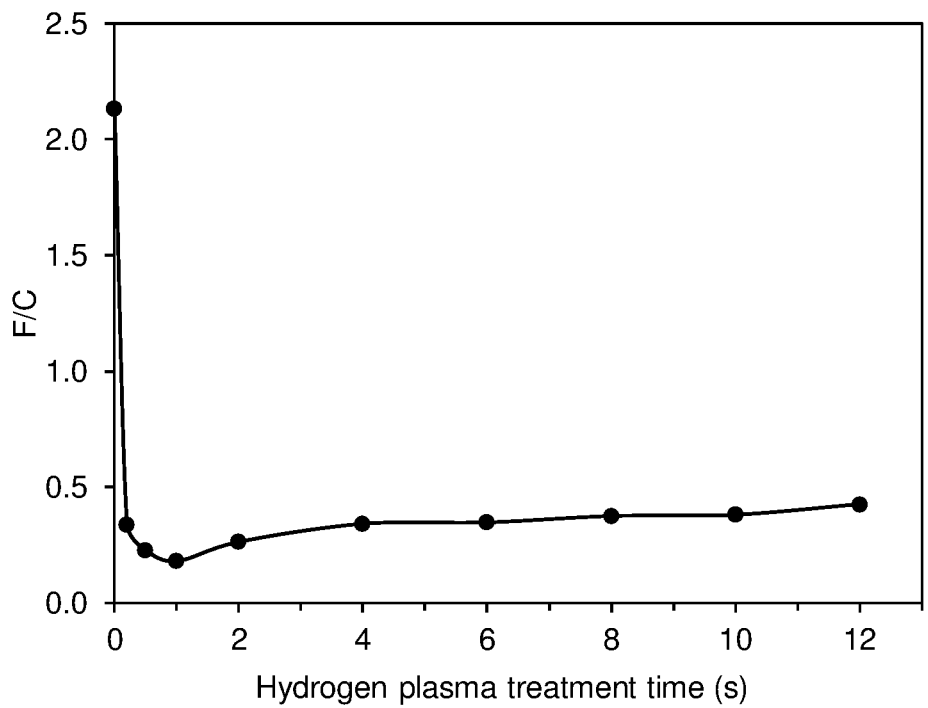
FIG. 4 shows the ratio between fluorine and carbon concentrations as deduced from XPS (X-ray photoelectron spectroscopy) survey spectra measured on the surface of the fluorine-containing polymer such as Teflon® after treatment with hydrogen plasma for different treatment times in the batch mode. The flux of VUV photons on the polymer surface was $5 \times 10^{20}$ m$^{-2}$ s$^{-1}$. The power density of RF power absorbed by plasma was $8 \times 10^6$ W m$^{-3}$.

FIG. 4 demonstrates an example of the method of the present disclosure when a fluorine-containing polymer (9) was treated by a two-step procedure as shown in FIG. 1. FIG. 4 is an experimental evidence for the depletion of the fluorine from the surface layer of a fluorine-containing polymer (9) after treatment with hydrogen plasma at preferred conditions, i.e. a preferred flux of VUV radiation and a preferred power density of hydrogen plasma. A fluorine-containing polymer (9) was a Teflon® sheet. Originally, the F/C ratio as deduced from the survey spectra as measured by X-ray photoelectron spectroscopy (XPS) was 2.13. This value is close enough to the theoretical value which is 2.00. The deviation may arise from the experimental error and stoichiometry of the virgin polymer. The F/C ratio after the treatment with hydrogen plasma in the plasma reactor (1) depends on the plasma treatment time as evidenced from FIG. 4. The lowest F/C ratio was found for the sample treated for 1 second in hydrogen plasma in the reactor chamber (1) at preferred conditions, i.e. a flux of VUV photons on the polymer surface of $5 \times 10^{20}$ $m^{-2}$ $s^{-3}$ and a power density of RF power absorbed by plasma of $8 \times 10^6$ W $m^{-3}$. Without wishing to be bound by theory, it is assumed that a short treatment time is favorable because the treatment of a fluorine-containing polymer (9) effects depletion of the surface layer from fluorine but without other effects which may not be beneficial. Without wishing to be bound by theory, it is assumed that the temperature of a fluorine-containing polymer (9) increases quickly with increasing treatment time in hydrogen plasma at a power density of RF power absorbed by plasma of $8 \times 10^6$ W $m^{-3}$. The fluorine-depleted layer on a polymer (9) may interact chemically with hydrogen species such as positively charged $H^+$ and $H_2^+$ ions as well as neutral atomic hydrogen. The interaction may lead to formation of $CH_x$ radicals on the surface. The radicals, especially those of x value equal or more than about 3 may desorb from the surface of a treated fluorine-containing polymer (9) upon vacuum condition. The effect is etching of the surface layer of a fluorine-containing polymer (9) depleted from fluorine by reactive hydrogen species. The etching intensity increases with increasing polymer temperature. The over-treatment of a fluorine-containing polymer (9) by hydrogen plasma has therefore a negative effect. Suitably therefore, the treatment time by hydrogen plasma should be therefore short enough to prevent such etching. However, it should also be long enough to facilitate depletion of fluorine in the surface film. In the experiment illustrated in FIG. 4, the optimal treatment time was found to be approximately 1 s at a power density of RF power absorbed by plasma of $8 \times 10^6$ W $m^{-3}$.

The polymer layer depleted from fluorine readily interacts chemically with reactive oxygen species. It is well known that the reactive oxygen species cause at least two effects on the surface of a polymer: (1) functionalization of the polymer surface with polar functional groups, and (2) removal of carbon from the surface of a polymer by formation of CO or $CO_2$ molecules. Without wishing to be bound by theory, it is assumed that a small fluence of reactive oxygen species causes insufficient functionalization with polar functional groups, while a large fluence causes etching of the fluorine-depleted surface layer. In between, there are optimal conditions for functionalization of the polymer surface with polar functional groups, thus improving hydrophilicity.

Figure 5:
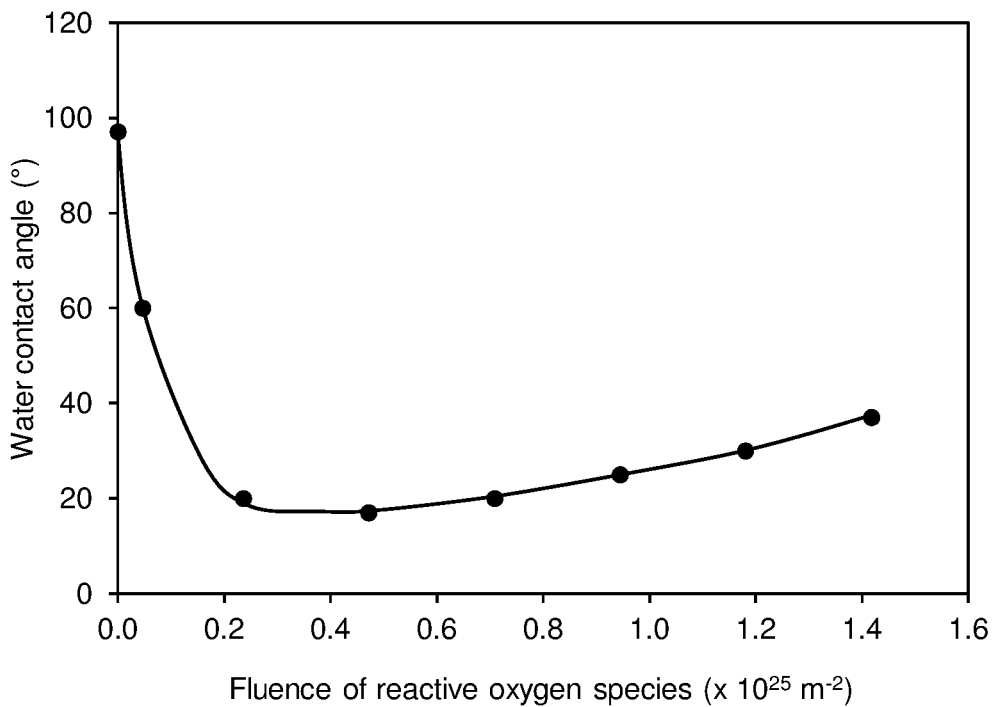
FIG. 5 shows the water contact angle on the surface of the fluorine-containing polymer such as Teflon® after subsequent treatment with hydrogen plasma at conditions stated in FIG. 4 for 1 second followed by treatment with reactive oxygen species with different fluences.

FIG. 5 shows the contact angle of a deionized water droplet on the surface of a fluorine-containing polymer material (9) such as Teflon® after subsequent treatments with hydrogen plasma in the plasma reactor (1) for 1 s, followed by treatment with reactive oxygen species in the second reactor (15). The abscissa in FIG. 5 represents the fluence of neutral oxygen atoms in the ground state. A minimum is observed in the graph presented in FIG. 5. Left from the minimum, the contact angle increases with decreasing fluence of oxygen atoms rather rapidly. Without wishing to be bound by theory, it is assumed that the increase is due to insufficient functionalization with polar functional groups. Right from the minimum, the contact angle increases slowly with increasing fluence. Without wishing to be bound by theory, it is assumed that such a slow increase is due to the etching of the fluorine-depleted film from the surface of a fluorine-containing polymer (9).

In the preferred embodiment, the methods of the present disclosure include 2 steps in two separate reactors: treatment of a fluorine-containing polymer (9) with hydrogen plasma in a plasma reactor (1) and subsequent treatment in the second reactor (15) with neutral reactive oxygen species from a source (6), in particular with neutral oxygen atoms in the ground state. The oxygen atoms in the ground state interact chemically with the fluorine-depleted polymer surface layer causing two effects: 1—functionalization with polar groups and 2—etching. Without wishing to be bound by theory, it is assumed that the predominant effect upon treatment of the fluorine-depleted polymer surface layer at room temperature is functionalization. Prolonged treatment will cause etching of the fluorine-depleted polymer surface layer and thus loss of the hydrophilic character of a fluorine-containing polymer (9) pre-treated with hydrogen plasma. Obviously, an optimal range of fluences of oxygen atoms exist. If the fluence of oxygen atoms is too low, the material is poorly functionalized. If the fluence of oxygen atoms is too high, the fluorine-depleted polymer surface layer is etched away. In one experiment, the most suitable flux of oxygen atoms was of the order of $10^{24}$ $m^{-2}$. FIG. 5 represents the experimental confirmation of this value. The experiment was performed in the setup presented in FIG. 1.

The purity of gases involved in the two-step procedure influences the surface finish of a fluorine-containing polymer (9). In one experiment, a mixture of oxygen and hydrogen (50:50) was applied instead of pure hydrogen in the first step. Practically no functionalization with polar groups was observed in this experiment. Without wishing to be bound by theory, it is assumed that admixture of a substantial amount of oxygen into hydrogen plasma does not allow for depletion of the surface layer of a fluorine-containing polymer (9) because oxygen reactive species simultaneously etch the surface layer of a fluorine-containing polymer (9). The tolerable amount of an oxygen containing gas was found to be below 10%, although below 5% may be preferred. Similar effects were observed by admixing nitrogen or ammonia, only the tolerable amount was somewhat larger.

The optimal duration of processing depends on the treatment parameters, such as the temperature of a fluorine-containing polymer (9), plasma parameters such as a flux of VUV/UV radiation or a power density and a fluence of neutral atoms. In the preferred embodiment, a fluorine containing material (9) is originally at room temperature. A fluorine-containing polymer (9) heats upon treatment with hydrogen plasma. In the preferred embodiment, the temperature of a fluorine-containing polymer (9) does not exceed 300° C. upon treatment with hydrogen plasma. Heating to a temperature between room temperature and 300° C. may be beneficial because it stimulates interaction of H atoms with F from a fluorine-containing polymer (9).

In the second step, the temperature of a fluorine-containing polymer (9) is kept close to room temperature. Elevated temperature is tolerable but at temperatures exceeding approximately 200° C. the etching of a fluorine-depleted polymer becomes dominant, therefore, the optimal surface finish (contact angle of a water droplet of approximately 20°) cannot be achieved.

The following treatment parameters have shown to be particularly advantageous: a flux of VUV photons on the polymer surface of $5 \times 10^{20}$ $m^{-2}$ $s^{-1}$, a power density of RF power absorbed by plasma of $8 \times 10^6$ W $m^{-3}$, room temperature as the original temperature of a fluorine-containing polymer (9), treatment time in hydrogen plasma 1 second, the fluence of oxygen atoms in the second step of $2 \times 10^{24}$ $m^{-2}$.

Some preferred embodiments of the present disclosure shall now be described with reference to the following non-limiting examples.

Example 1

The experimental set up for Example 1 is shown schematically in FIG. 1. It is suitable for treatment of a fluorine-containing polymer (9) in a batch mode. A plasma reactor (1) is pumped with a vacuum pump (2) which may be separated from the plasma reactor (1) with a gate valve (3). Hydrogen is introduced into the plasma reactor (1) through a flow controller or a leak valve (4) from a hydrogen flask (5). The source of reactive oxygen species (6) is mounted onto the plasma reactor (1). The valve (7) enables separating the source of reactive oxygen species (6) from the plasma reactor (1). The plasma reactor (1) is powered with a power supply (8) which enables sustenance of gaseous plasma inside the plasma reactor (1).

A piece of a fluorine-containing polymer (9) is placed inside the plasma reactor (1). The plasma reactor (1) is evacuated with a two-stage rotary pump (2) down to the pressure of below 1 Pa. Hydrogen of purity 99.99% is then leaked into the plasma reactor (1) through a flow controller (4) during continuous pumping. The flow controller (4) is adjusted to 150 sccm and the pressure in the plasma reactor is 25 Pa. At the pressure of 25 Pa and upon continuous pumping plasma was created in the plasma reactor (1) using a radiofrequency generator (8) operating at the standard industrial frequency of 13.56 MHz. The power density of RF power absorbed by plasma was $8 \times 10^6$ W $m^{-3}$. The treatment time was 1 s. After treating of the piece of a fluorine-containing polymer (9) with hydrogen plasma for 1 s, the flow controller was set to 0 sccm and the pressure in the plasma reactor (1) dropped below 1 Pa in several seconds. Upon continuous evacuation, the valve (7) was opened and the gas from the source of reactive oxygen species (6) was introduced continuously into the plasma reactor (1). The source of reactive oxygen species (6) was a microwave discharge sustained in a quartz tube of an inner diameter 6 mm in the surfatron mode [Primc 2001]. The piece of a fluorine-containing polymer (9) was subjected to atomic oxygen from the source of reactive oxygen species (6) until the flux of $2 \times 10^{24}$ $m^{-2}$ was achieved. Then, the source of reactive oxygen species (6) was separated from the plasma reactor (1) by closing the valve (7). The vacuum pump (2) was separated from the plasma reactor (1) by closing the gate valve (3). The plasma reactor (1) was vented and the piece of a fluorine-containing polymer (9) was removed from the plasma reactor (1) and probed with a water droplet. The contact angle on the surface of the piece of a fluorine-containing polymer (9) after subjected to this procedure was 20°.

Example 2

Example 2 discloses a configuration suitable for treatment of a polymer foil in the continuous mode. A plasma reactor (1) was pumped with a vacuum pump (2). Hydrogen was introduced into the plasma reactor (1) through a flow controller or a leak valve (4) from a hydrogen flask (5) during continuous pumping. A fluorine-containing polymer (9) from the first roll-on unit (10) entered the plasma reactor (1) through the first inlet system (12) which was essentially hermetically tight, therefore it prevented any mixing of a surrounding gas with hydrogen inside the plasma reactor (1). The plasma reactor (1) was powered with a power supply (8) which enabled sustenance of gaseous plasma inside the plasma reactor (1). The fluorine-containing material (9) moved through the plasma reactor (1) in the sense marked with the arrow (13) and reached the second inlet system (14) which was essentially hermetically tight to prevent any mixing of hydrogen inside the plasma reactor (1) with any gas inside the second reactor (15). The second reactor (15) was equipped with a source of reactive oxygen species (6) and pumped continuously with a second vacuum pump (16) what enabled a continuous supply of reactive oxygen species from the source (6) through a flow controller or a leak valve (7) into the second reactor (15). A fluorine-containing material (9) further moved through the second reactor (15) in the sense marked with the arrow (18) and reached the outlet system (19) which was essentially hermetically tight to prevent any mixing of reactive oxygen species inside the second reactor (15) with the surrounding gas. After passing the outlet system (19), a fluorine-containing material (9) reached the second roll-on unit (11).

First, the setup as shown in FIG. 2 was assembled. A fluorine-containing material (9) was fixed to the first roll-on unit (10) as shown in FIG. 2. The valve (4) was closed. The two-stage rotary pumps (2) and (16) were turned on so that a pressure below about 1 Pa was achieved in both plasma reactor (1) and second reactor (15). After achieving the ultimate pressure in both plasma reactor (1) and second reactor (15), the valve (4) was open while the both pumps kept pumping the reactors (1) and (15). Both the radiofrequency generator (8) and the source of reactive oxygen species (6) were turned on and a fluorine-containing polymer foil (9) started moving at a constant speed of 0.5 m/s in the direction marked with the arrow (13). The moving of a fluorine-containing polymer foil (9) was therefore in such a way that a fluorine-containing polymer foil (9) first entered the plasma reactor (1) and then the second reactor (15). Upon passing the plasma reactor (1), the surface layer of a fluorine-containing polymer foil (9) was depleted from fluorine due to the effects explained to details in the text above. After passing the plasma reactor (1), a fluorine-containing polymer foil (9) entered the second reactor (15) where it was subjected to a flux of oxygen atoms. The optimal fluence of oxygen atoms of about $3 \times 10^{24}$ m$^{-3}$ enabled functionalization of a fluorine-containing polymer foil (9) with polar functional groups. The contact angle on the surface of a fluorine-containing polymer foil (9) after subjected to this procedure was 20°.

Example 3

Example 3 discloses an alternative configuration suitable for the two-step procedure in a continuous mode. A plasma reactor (1) was pumped with a vacuum pump (2) which may be separated from the plasma reactor with a gate valve (3). Hydrogen was introduced into the plasma reactor (1) through a flow controller or a leak valve (4) from a hydrogen flask (5). The source of reactive oxygen species (6) was mounted onto the plasma reactor (1). The valve (7) enabled separating the source of reactive oxygen species (6) from the plasma reactor (1). The plasma reactor (1) was powered with a power supply (8) which enabled sustenance of gaseous plasma inside the plasma reactor (1). A polymer foil (9) was placed inside the plasma reactor (1). A fluorine-containing polymer foil (9) was mounted onto the roll-to-roll system (10, 11) which enabled moving the material from one (10) to another roll-on unit (11) of the roll-to-roll system (10, 11) in both senses.

First, a fluorine-containing polymer foil (9) was mounted onto the first roll-on unit (10) of the roll-to-roll system which enabled moving the material from one (10) to another roll-on unit (11) of the roll-to-roll system (10, 11) in both senses (that is, from left to right and/or from right to left). The plasma reactor (1) was evacuated with a two-stage rotary pump (2) so that the ultimate pressure below about 1 Pa was established in the plasma reactor (1). Then, the flow controller (4) was opened so that hydrogen from flask (5) entered the plasma reactor (1). The two-stage rotary pump (2) kept pumping the plasma reactor (1) during continuous inflow of hydrogen so that a hydrogen pressure inside the plasma reactor of 20 Pa was established. Simultaneously, the radiofrequency generator (8) was turned on and a fluorine-containing polymer foil (9) started moving from one roll (10) to another one (11) of the roll-to-roll system (10, 11) in the sense marked with the arrow (13). The radiofrequency generator (8) kept sustaining hydrogen plasma in the plasma reactor (1) until the entire fluorine-containing polymer foil (9) was subjected to hydrogen plasma. Once the entire fluorine-containing polymer foil (9) was processed with hydrogen plasma, the radiofrequency generator (8) was turned off. The flow controller (4) was closed and the two-stage rotary pump pumped the plasma reactor (1) down to an ultimate pressure which was about 1 Pa. Then, the valve (7) was opened and the source of reactive oxygen species (6) was turned on. A fluorine-containing polymer foil (9) kept running in the direction opposite to that marked with the arrow (13) until the entire fluorine-containing polymer foil (9) was subjected to the flux of the oxygen atoms of about $4 \times 10^{24}$ m$^{-2}$. When the entire fluorine-containing polymer foil (9) was treated in this step, the source of reactive oxygen species (6) was turned off, the valves (3) and (7) were closed, the plasma reactor (1) was vented and the fluorine-containing polymer foil (9) was removed from the plasma reactor (1). The contact angle on the surface of a fluorine-containing polymer foil (9) after subjected to this procedure was approximately 20°.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the present disclosure in diverse forms thereof.

While the present disclosure has been described in conjunction with the exemplary embodiments described above, many equivalent modifications and variations will be apparent to those skilled in the art when given this disclosure. Accordingly, the exemplary embodiments of the present disclosure set forth above are considered to be illustrative and not limiting. Various changes to the described embodiments may be made without departing from the spirit and scope of the present disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example ±30%.

REFERENCES

A number of publications are cited above to more fully describe and disclose the invention and the state of the art to which the invention pertains. Full citations for these references are provided below. The entirety of each of these references is incorporated herein.

N. De Geyter, R. Morent, C. Leys, Influx of ambient conditions on the ageing behaviour of plasma-treated PET surfaces, Nuclear Instruments and Methods in Physics Research Section B: Beam Interactions with Materials and Atoms, 266 (2008) 3086-3090.

Wenfeng Hai, Tei Hi, Keita Shimuzu and Tatsuhiko Yasjima, Preparation of Superhydrophilic Polytetrafluorethylene Surface Using a Gaseous Amonia-Water Low-Temperature Plasma, Journal of Photopolymer Science and Technology 28 (2015) 479-483.

U. Fantz, S. Briefi, D. Rauner, D. Wünderlich, Quantification of the VUV radiation in low pressure hydrogen and nitrogen plasmas, Plasma Sources Sci. Technol. 25 (2016) 045006.

M. Fouchier et al, Vacuum ultra violet absorption spectroscopy of 193 nm photoresists, Appl Phys A (2011) 105: 399-405.

K. Kutasi, R. Zaplotnik, G. Primc, and M. Mozetic, Controlling the oxygen species density distributions in the flowing afterglow of $O_2/Ar$—$O_2$ surface-wave microwave discharges, J. Phys. D: Appl. Phys. 47 (2014) 025203 (11pp).

J. Larrieu, B. Held, H. Martinez, Y. Tison, Ageing of atactic and isotactic polystyrene thin films treated by oxygen DC pulsed plasma, Surface and Coatings Technology, 200 (2005) 2310-2316.

Liu H, Zhang H and Chen J, Surface analysis of long-distance oxygen plasma sterilized PTFE film, Applied Surface Science 255 (2009) 8115-8121.

R. Morent, N. De Geyter, C. Leys, L. Gengembre, E. Payen, Study of the ageing behaviour of polymer films treated with a dielectric barrier discharge in air, helium and argon at medium pressure, Surface and Coatings Technology, 201 (2007) 7847-7854.

G. Primc at al, "Microwave discharge as a remote source of neutral oxygen atoms", AIP ADVANCES 1, 022129 (2011)

Salapare H S, Guittard F, Noblin X, et al. Stability of the hydrophilic and superhydrophobic properties of oxygen plasma-treated poly(tetrafluoroethylene) surfaces, Journal of Colloid and Interface Science 396 (2013) 287-292.

A. Vesel, I. Junkar, U. Cvelbar, J. Kovac, M. Mozetic, Surface modification of polyester by oxygen- and nitrogen-plasma treatment, Surf Interface Anal, 40 (2008) 1444-1453.

Wilson D J, Williams R L and Pond R C, Plasma modification of PTFE surfaces Part I: Surfaces immediately following plasma treatment, Surface and Interface Analysis 31 (2001) 385-396.

CN107118381 (A)
CN106268370 (A)
CN105727753 (A)
CN104998562 (A)
CN107174981 (A)
CN103302862 (A)
CN202293551 (U)
CN101890314 (A)
U.S. Pat. No. 7,258,906 (B2).

The invention claimed is:

1. A method of increasing the hydrophilicity of a fluorine-containing polymer, the method comprising:
   (i) a first step of treating a surface of a fluorine-containing polymer with radiation having a photon energy at least 6 eV and not more than 11.3 eV, and a flux of at least $10^{20}$ m$^{-2}$ and at most $10^{22}$ m$^{-2}$ s$^{-1}$, to deplete the fluorine content of the surface of the fluorine-containing polymer; then
   (ii) exposing the treated surface to neutral oxygen atoms in the absence of plasma conditions, the fluence of said neutral oxygen atoms being between $10^{24}$ and $10^{26}$ m$^{-2}$.

2. The method of claim 1, wherein the method comprises:
   (i) a first step of treating the surface of the fluorine-containing polymer contemporaneously with radiation having a photon energy at least 6 eV and not more than 11.3 eV, and a flux of at least $10^{20}$ m$^{-2}$s$^{-1}$, and with hydrogen atoms having a flux of $10^{20}$ to $10^{24}$ m$^{-2}$ s$^{-1}$; then
   (ii) exposing the treated surface to neutral oxygen atoms in the absence of plasma conditions, the fluence of said neutral oxygen atoms being between $10^{24}$ and $10^{26}$ m$^{-2}$.

3. The method of claim 2, wherein the first step uses hydrogen plasma as source of both radiation and hydrogen atoms.

4. The method of claim 3, wherein the power density of the plasma is between $10^6$ W m$^{-3}$ and $10^8$ W m$^{-3}$.

5. The method of claim 3, wherein the hydrogen pressure is between 1 and 100 Pa.

6. The method of claim 5, wherein the hydrogen pressure is between 10 and 30 Pa.

7. The method of claim 1, wherein the time of exposure of said fluorine-containing polymer to radiation in the first step is less than 10 s.

8. The method of claim 1, wherein the duration of exposing the treated surface to the neutral oxygen atoms is less than 100 s.

9. The method of claim 1, wherein step (i) and step (ii) are performed in the same reactor, and wherein between step (i) and step (ii) the reactor is evacuated to remove the hydrogen and hydrogen plasma by-products.

10. The method of claim 1, wherein step (i) and step (ii) are performed in separate reactors.

11. The method of claim 10, wherein method provides treatment of a length of fluorine-containing polymer film, wherein the method comprises passing the film through a first reactor, in which it undergoes step (i) then passing the treated film through an essentially gas-tight flow path to a second reactor in which it undergoes step (ii).

* * * * *